(12) United States Patent
Matsubara et al.

(10) Patent No.: US 10,032,566 B2
(45) Date of Patent: Jul. 24, 2018

(54) METHOD OF MANUFACTURING SOLID ELECTROLYTIC CAPACITOR, AND SOLID ELECTROLYTIC CAPACITOR

(71) Applicant: Murata Manufacturing Co., Ltd., Nagaokakyo-shi, Kyoto-fu (JP)

(72) Inventors: Takaharu Matsubara, Nagaokakyo (JP); Masamichi Shiko, Nagaokakyo (JP); Daisuke Kasahara, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 168 days.

(21) Appl. No.: 14/731,541

(22) Filed: Jun. 5, 2015

(65) Prior Publication Data
US 2015/0357122 A1 Dec. 10, 2015

(30) Foreign Application Priority Data

Jun. 5, 2014 (JP) .................................. 2014-116762

(51) Int. Cl.
| | |
|---|---|
| *H01G 9/15* | (2006.01) |
| *H01G 9/00* | (2006.01) |
| *H01G 9/012* | (2006.01) |
| *H01G 9/14* | (2006.01) |

(52) U.S. Cl.
CPC ............. *H01G 9/15* (2013.01); *H01G 9/0029* (2013.01); *H01G 9/012* (2013.01); *H01G 9/14* (2013.01); *Y10T 29/42* (2015.01)

(58) Field of Classification Search
CPC ........ H01G 9/15; H01G 9/0029; H01G 9/012; H01G 9/14; Y10T 29/42
See application file for complete search history.

(56) References Cited

U.S. PATENT DOCUMENTS

| | | | | |
|---|---|---|---|---|
| 6,665,172 | B1 * | 12/2003 | Kim ....................... | H01G 9/012 361/523 |
| 2002/0167786 | A1 * | 11/2002 | Sano ....................... | H01G 9/012 361/509 |
| 2004/0066608 | A1 * | 4/2004 | Takagi ................... | H01G 9/012 361/530 |
| 2004/0085712 | A1 * | 5/2004 | Tadanobu .............. | H01G 9/012 361/523 |
| 2005/0057889 | A1 * | 3/2005 | Kato ....................... | H01G 9/012 361/523 |
| 2006/0285277 | A1 * | 12/2006 | Hirata .................... | H01G 9/012 361/528 |
| 2009/0067120 | A1 * | 3/2009 | Matumoto ............. | H01G 9/012 361/524 |
| 2011/0205689 | A1 * | 8/2011 | Vilcova ................. | H01G 9/012 361/525 |

(Continued)

FOREIGN PATENT DOCUMENTS

JP 2003-124074 A 4/2003

*Primary Examiner* — Dion R Ferguson
(74) *Attorney, Agent, or Firm* — Arent Fox LLP (57) ABSTRACT

A method of manufacturing a solid electrolytic capacitor wherein a resistance increasing process is performed on at least one of a bonding portion of an anode lead terminal and a bonding portion of an anode in order to increase contact resistance between the anode lead terminal and the anode. Thereafter, the anode and the anode lead terminal are welded to each other by resistance welding at the bonding portions.

3 Claims, 6 Drawing Sheets

(56) References Cited

U.S. PATENT DOCUMENTS

| | | | |
|---|---|---|---|
| 2013/0321985 A1* | 12/2013 | Djebara | H01G 9/012 361/528 |
| 2013/0321986 A1* | 12/2013 | Djebara | B23K 11/20 361/528 |
| 2015/0194270 A1* | 7/2015 | Katsube | H01G 9/15 174/257 |

* cited by examiner

METHOD OF MANUFACTURING SOLID ELECTROLYTIC CAPACITOR, AND SOLID ELECTROLYTIC CAPACITOR

BACKGROUND OF THE INVENTION

Field of the Invention

The present invention relates to a method of manufacturing a solid electrolytic capacitor, and to the solid electrolytic capacitor. More particularly, the present invention relates to a method of manufacturing a solid electrolytic capacitor having a structure that an anode lead terminal is bonded to an anode of a capacitor element by the resistance welding method, and further relates to the solid electrolytic capacitor.

Description of the Related Art

Figure 6:
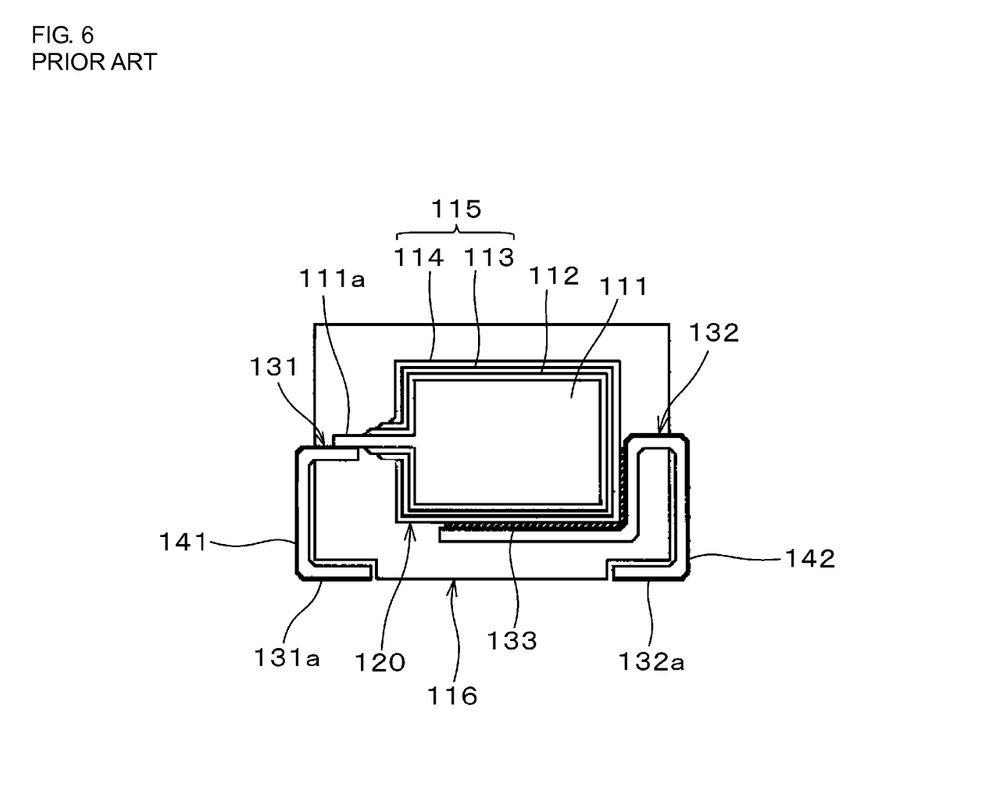
FIG. 6 illustrates a solid electrolytic capacitor of related art.

As illustrated in FIG. 6, one type of related-art solid electrolytic capacitor 1 includes a capacitor element 120 including an anode (anode member) 111, a dielectric layer 112 disposed on the anode 111, and a cathode 115 disposed opposite to the anode 111 with the dielectric layer 112 interposed therebetween, an anode lead terminal 131 connected to the anode 111 of the capacitor element 120, and a cathode lead terminal 132 connected to the cathode 115, wherein the solid electrolytic capacitor is entirely encapsulated by an outer coating resin 116 except for respective lead-out portions (exposed portions) 131a and 132a of the anode lead terminal 131 and the cathode lead terminal 132 (see Japanese Unexamined Patent Application Publication No. 2003-124074).

In the solid electrolytic capacitor mentioned above, the cathode 115 includes a conductive polymer layer 113, which is a cathode electrolyte disposed on the dielectric layer 112, and a cathode lead-out layer 114.

The anode lead terminal 131 is connected to a connecting portion (anode lead pin) 111a of the anode 111 by welding, and the cathode lead terminal 132 is connected to the cathode lead-out layer 114 of the cathode 115 by employing a conductive adhesive 133.

Furthermore, in the solid electrolytic capacitor disclosed in Japanese Unexamined Patent Application Publication No. 2003-124074, gold plating layers 141 and 142 are formed on the anode lead terminal 131 and the cathode lead terminal 132, respectively, for the purpose of not only improving and stabilizing solderability with respect to a printed wiring board, but also reducing and stabilizing connection electrical resistance in a portion of the cathode lead terminal 132 where the cathode lead terminal 132 is connected to the capacitor element (electrical component element) 120 through the conductive adhesive 133.

In the solid electrolytic capacitor having the above-described structure disclosed in Japanese Unexamined Patent Application Publication No. 2003-124074, however, when trying to weld the connecting portion (anode lead pin) 111a of the anode 111 and the anode lead terminal 131 to each other by the resistance welding method that is widely used as a general technique, if contact resistance between the anode and the anode lead terminal is low, sufficient heating would not be obtained, and a difficulty would be caused in reliably bonding the anode lead terminal and the anode to each other. This may lead to the problem that the anode lead terminal and the anode are not bonded to each other in some cases (i.e., a bonding failure), or that the anode lead terminal may be dropped (peeled) from the anode due to insufficient bonding strength during a later manufacturing step or during actual use as a product.

In the embodiment disclosed in Japanese Unexamined Patent Application Publication No. 2003-124074, the gold plating layer is formed on the anode lead terminal. Therefore, the contact resistance between the anode and the anode lead terminal tends to lower, and the above-mentioned problem is more apt to occur.

It is conceivable to increase energy during the resistance welding (i.e., welding power) in order to reduce the above-mentioned troubles, such as the failure of bonding between the anode lead terminal and the anode, and the dropping (peeling) of the anode lead terminal during the manufacturing step or the actual use. However, if the energy during the resistance welding is too large, another problem arises in that an incidence of the so-called splash failure, i.e., scattering of metal to the surroundings, increases.

SUMMARY OF THE INVENTION

With the view of solving the problems described above, an object of the present invention is to provide a solid electrolytic capacitor manufacturing method capable of reliably manufacturing a solid electrolytic capacitor in which strength of bonding between an anode and an anode lead terminal is sufficient and reliability is high, and to provide the solid electrolytic capacitor, which is manufactured by that manufacturing method, and which has high reliability.

According to one preferred embodiment of the present invention, there is provided a method of manufacturing a solid electrolytic capacitor including a capacitor element that includes an anode, a dielectric layer disposed on the anode, and a cathode disposed on the dielectric layer, an anode lead terminal bonded for electrical connection to the anode of the capacitor element, and a cathode lead terminal bonded for electrical connection to the cathode of the capacitor element, the method including the steps of performing a resistance increasing process on a bonding portion of the anode lead terminal with respect to the anode in order to increase contact resistance between the anode lead terminal and the anode, and welding the bonding portion of the anode lead terminal, the bonding portion having been subjected to the resistance increasing process, to the anode by resistance welding.

According to another preferred embodiment of the present invention, there is provided a method of manufacturing a solid electrolytic capacitor including a capacitor element that includes an anode, a dielectric layer disposed on the anode, and a cathode disposed on the dielectric layer, an anode lead terminal bonded for electrical connection to the anode of the capacitor element, and a cathode lead terminal bonded for electrical connection to the cathode of the capacitor element, the method including the steps of performing a resistance increasing process on a bonding portion of the anode with respect to the anode lead terminal in order to increase contact resistance between the anode and the anode lead terminal, and welding the bonding portion of the anode, the bonding portion having been subjected to the resistance increasing process, to the anode lead terminal by resistance welding.

According to still another preferred embodiment of the present invention, there is provided a method of manufacturing a solid electrolytic capacitor including a capacitor element that includes an anode, a dielectric layer disposed on the anode, and a cathode disposed on the dielectric layer, an anode lead terminal bonded for electrical connection to the anode of the capacitor element, and a cathode lead terminal bonded for electrical connection to the cathode of the capacitor element, the method including the steps of performing a resistance increasing process on each of a bonding portion of the anode with respect to the anode lead terminal and a bonding portion of the anode lead terminal with respect to the anode in order to increase contact resistance between the anode and the anode lead terminal, and welding the bonding portion of the anode and the bonding portion of the anode lead terminal, the bonding portions having been subjected to the resistance increasing process, to each other by resistance welding.

In the method of manufacturing the solid electrolytic capacitor according to the preferred embodiment of the present invention, preferably, the resistance increasing process is performed by at least one method selected from a group consisting of a method of forming a recess and/or a projection in the bonding portion to reduce a contact area in the bonding portion, a method of forming a penetration hole in the bonding portion to reduce a contact area in the bonding portion, and a method of forming an oxide coating, which has large insulation resistance, on the bonding portion.

By performing the resistance increasing process by one of the above-mentioned methods, the contact resistance in the bonding portion can be reliably increased, and the anode lead terminal and the anode can be bonded to each other by the resistance welding with higher reliability. Thus, the present invention can be made more effective in practice.

According to still another preferred embodiment of the present invention, there is provided a solid electrolytic capacitor manufactured by the above-described method of manufacturing the solid electrolytic capacitor.

With the method of manufacturing the solid electrolytic capacitor according to the preferred embodiment of the present invention, after performing the resistance increasing process on the bonding portion of the anode lead terminal with respect to the anode in order to increase the contact resistance between the anode lead terminal and the anode, the bonding portion of the anode lead terminal, the bonding portion having been subjected to the resistance increasing process, and the anode are welded to each other by the resistance welding. Therefore, electrical resistance during the resistance welding can be increased. As a result, the amount of heat generated in the bonding portion is increased and reliable resistance welding is performed, whereby stable bonding can be obtained between the anode and the anode lead terminal.

As with the method of manufacturing the solid electrolytic capacitor according to the other preferred embodiment of the present invention, when the resistance increasing process is performed on the bonding portion of the anode with respect to the anode lead terminal in order to increase the contact resistance between the anode and the anode lead terminal, and thereafter the bonding portion of the anode, the bonding portion having been subjected to the resistance increasing process, and the anode lead terminal are welded to each other by the resistance welding, it is also possible to increase electrical resistance during the resistance welding, and to increase the amount of heat generated in the bonding portion. As a result, stable bonding can be obtained between the anode and the anode lead terminal.

As with the method of manufacturing the solid electrolytic capacitor according to the still other preferred embodiment of the present invention, when the resistance increasing process is performed on each of the bonding portion of the anode with respect to the anode lead terminal and the bonding portion of the anode with respect to the anode lead terminal in order to increase the contact resistance between the anode and the anode lead terminal, and thereafter the bonding portion of the anode lead terminal and the bonding portion of the anode, the bonding portions having been subjected to the resistance increasing process, are welded to each other by the resistance welding, it is possible to more reliably increase electrical resistance during the resistance welding, and to increase the amount of heat generated in the bonding portion. As a result, even stable bonding can be obtained between the anode and the anode lead terminal.

With the solid electrolytic capacitor according to the still other preferred embodiment of the present invention, since the solid electrolytic capacitor is manufactured by the method of manufacturing the solid electrolytic capacitor according to the preferred embodiment of the present invention, a highly reliable solid electrolytic capacitor can be provided in which the anode and the anode lead terminal are reliably bonded to each other.

Other features, elements, characteristics and advantages of the present invention will become more apparent from the following detailed description of preferred embodiments of the present invention with reference to the attached drawings.

DETAILED DESCRIPTION OF THE PREFERRED EMBODIMENTS

A method of manufacturing a solid electrolytic capacitor, according to one preferred embodiment of the present invention, will be described in detail below in connection with an exemplary embodiment of the present invention.

Figure 1:
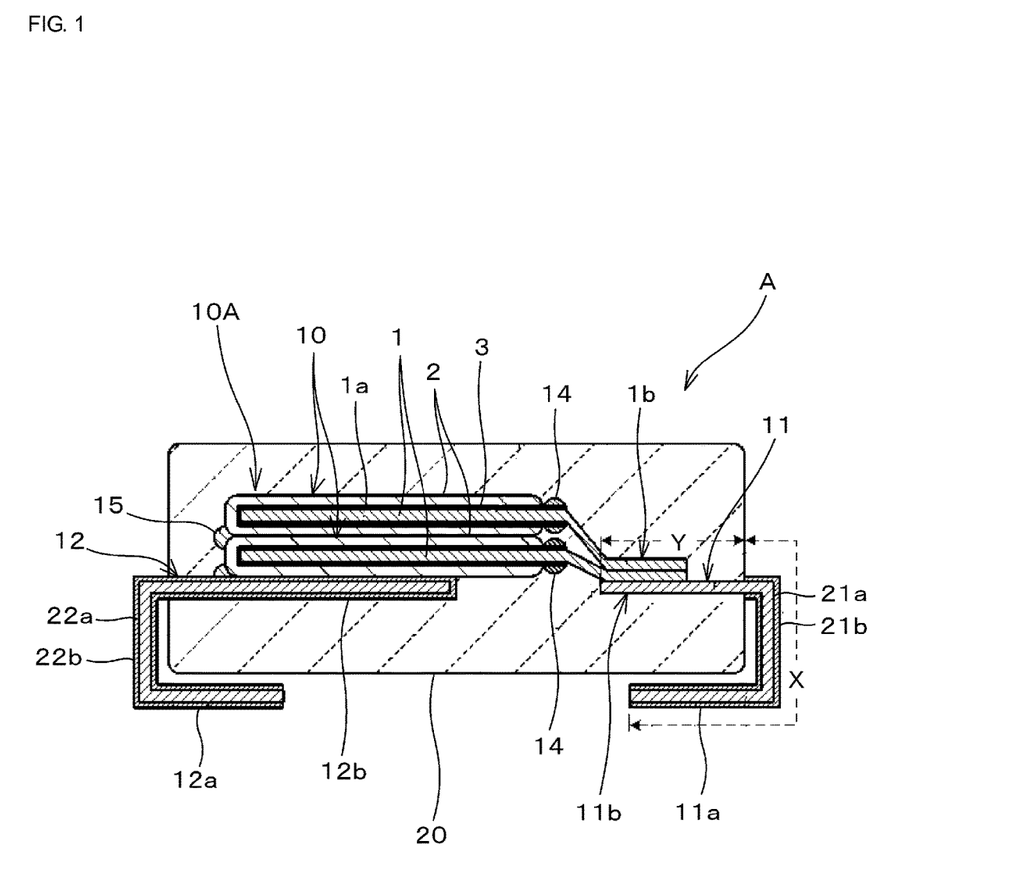
FIG. 1 illustrates a solid electrolytic capacitor according to an embodiment of the present invention.

A solid electrolytic capacitor A manufactured in this embodiment includes, as illustrated in FIG. 1, two capacitor elements 10 each including an anode 1, a dielectric layer 3 disposed on the anode 1, and a cathode 2 disposed on the dielectric layer 3, an anode lead terminal 11 bonded for electrical connection to the anode 1 of the capacitor element 10, a cathode lead terminal 12 bonded for electrical connection to the cathode 2 of the capacitor element 10, and an outer coating resin 20 that covers a multilayer body 10A made up of the two capacitor elements 10 stacked one above the other, a bonding portion of the anode lead terminal 11 with respect to the anode 1 and thereabout, and a bonding portion of the cathode lead terminal 12 with respect to the cathode 2 and thereabout.

A lead-out portion 11a of the anode lead terminal 11 and a lead-out portion 12a of the cathode lead terminal 12 are led out to extend from the outer coating resin 20 to the outside, and are bent to further extend along the outer coating resin 20.

The anode lead terminal 11 and the cathode lead terminal 12 are formed by forming Au plating layers 21b and 22b on Cu base materials 21a and 22a, respectively. In more detail, looking at the anode lead terminal 11, in the lead-out portion 11a extending from the outer coating resin 20, the surface of the Cu base material 21a is coated with the Au plating layer 21b in order to ensure weatherability and plating adhesion. On the other hand, in a bonding portion 11b to the anode 1, the anode lead terminal 11 is constituted in a state where the Au plating layer is not formed and the Cu base material 21a is exposed, for the purpose of making it easy to ensure resistance that is necessary for performing the resistance welding between the bonding portion 11b and the anode 1.

Because the cathode lead terminal 12 is connected to the cathode 2 by employing a conductive adhesive, the cathode lead terminal 12 is not particularly required to have large contact resistance. Therefore, the surface of the Cu base material 22a is entirely coated with the Au plating layer 22b.

A method of manufacturing the solid electrolytic capacitor A, constituted as described above, will be described below.

(1) Fabrication of Capacitor Element

An aluminum foil (anode) 1 including a porous layer formed on its surface is subjected to anodic oxidation in an aqueous solution of ammonium adipate to form the dielectric layer 3, which is made of aluminum oxide, on the surface of the porous layer. The anodic oxidation is performed under conditions of 60° C. and 35 V.

Then, a blocking member (insulating resin having electrical insulation) 14 is disposed on the surface of the anode 1 including the dielectric layer 3 at a boundary between a "region where the cathode 2 is to be formed", denoted by 1a, and a "region where the cathode 2 is not to be formed (i.e., a bonding portion to the anode lead terminal 11), denoted by 1b.

Subsequently, the "region 1a where the cathode portion 2 is to be formed" of the anode 1 including the dielectric layer 3 is immersed in a dispersion solution of PEDOT/PSS (poly(3,4-ethylenedioxythiophene doped with polystyrene sulfonate), and is then dried such that a solid electrolyte (polymer) is filled and placed into pores of the porous layer.

In order to coat the "region 1a where the cathode 2 is to be formed" in which the solid electrolyte has been filled into the pores of the porous layer, with a polymer film made of a solid electrolyte, a dispersion solution of PEDOT/PSS is printed over the surface of the "region 1a where the cathode 2 is to be formed", and is then dried to form the polymer layer (solid electrolyte layer).

Thereafter, a carbon paste is coated over the above-mentioned polymer layer, and is then dried to form a carbon layer on the polymer layer. Furthermore, an Ag paste is coated over the carbon layer, and is then dried to form an Ag layer on the carbon layer.

As a result, a single unit of the capacitor element 10 is obtained which includes the anode (aluminum foil) 1, the dielectric layer (aluminum oxide layer) 3 disposed on the anode 1, and the cathode (solid electrolyte layer+carbon layer+Ag layer) 2 disposed on the dielectric layer 3.

(2) Fabrication of Anode Lead Terminal and Cathode Lead Terminal

To form the anode lead terminal 11 and the cathode lead terminal 12, the Cu base material 21a for the anode lead terminal and the Cu base material 22a for the cathode lead terminal 12 are first prepared.

The Cu base materials 21a and 22a may be provided in integral form, for example, by punching out a strip-shaped hoop.

Then, for the anode lead terminal 11, Au is plated over a region of the Cu base material 21a, the region becoming the lead-out portion 11a, (i.e., a region of the Cu base material 21a except for the bonding portion 11b to the anode 1, including the opposite side surface thereof). As a result, the anode lead terminal 11 is obtained which has an Au region X where a surface layer is formed of the Au plating layer 21b, and a Cu region Y where the Au plating layer is not formed and the Cu base material 21a is exposed.

More specifically, the anode lead terminal 11 is fabricated through the steps of plating Ni on the Cu base material 21a in a state where a region becoming the Cu region Y of the Cu base material 21a later is masked with a masking material, thereby forming a Ni plating layer that serves as an underlying layer, plating Au on the Ni plating layer to form the Au plating layer 21b that serves as a surface layer (uppermost layer), and then removing the masking material. In the anode lead terminal 11, the above-mentioned masked region becomes the Cu region Y, and the region where the Au plating layer 21b is formed on the Ni plating layer with no masking becomes the Au region X.

Figure 2:
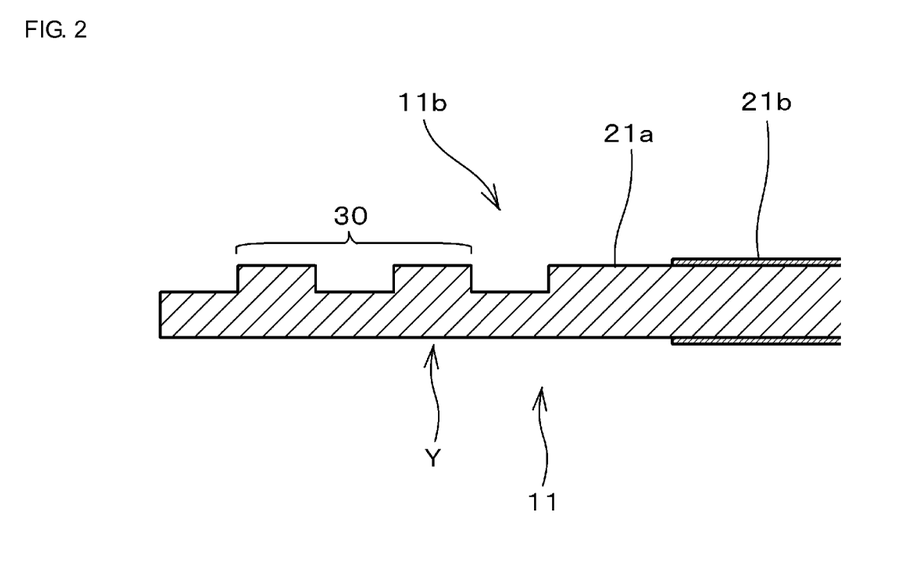
FIG. 2 illustrates a state where a resistance increasing process has been performed on a bonding portion of an anode lead terminal with respect to an anode in one step of a method of manufacturing the solid electrolytic capacitor according to an embodiment of the present invention.

Thereafter, as illustrated in FIG. 2, a resistance increasing process is performed on the Cu region Y of the anode lead terminal 11, which region becomes the bonding portion 11b to the anode 1. In the resistance increasing process, the Cu region Y of the anode lead terminal 11 is pressed to form one or more recesses and projections 30 in the region that becomes the bonding portion 11b to the anode 1.

By forming the one or more recesses and projections 30 in the Cu region Y (i.e., the bonding portion 11b) of the anode lead terminal 11, a contact area of the anode lead terminal 11 with the anode 1 is reduced in comparison with that in the case not forming the one or more recesses and projections 30, and the contact resistance between them is increased. As a result, when the anode lead terminal 11 and the anode 1 are bonded to each other by resistance welding, the amount of generated heat is increased and the resistance welding is performed in a reliable way. Hence highly reliable bonding is obtained.

Furthermore, by forming the one or more recesses and projections 30 in the Cu region Y (i.e., the bonding portion 11b) of the anode lead terminal 11, it is possible to limit a welded spot or zone to a target position or region, and to obtain stable bonding.

The resistance increasing process for increasing the contact resistance can also be performed by, instead of the above-mentioned method of forming the one or more recesses and projections, another suitable method, such as forming one or more projections alone or one or more recesses alone in the bonding portion, boring a penetration hole in the bonding portion, or forming an oxide coating on the surface of the bonding portion.

On the surface of the bonding portion, an oxide coating is naturally formed in some cases. However, when the oxide coating is formed by the resistance increasing process in the present invention, a thicker oxide coating is formed intentionally in comparison with the oxide coating when it is naturally formed. More specifically, according to one exemplary method, a sufficiently thick oxide coating is formed on the Cu region (i.e., the bonding portion) of the anode lead terminal 11 by partially heating the Cu region to about 150°

C. to 200° C., for example. The oxide coating formed by the above-described method has a thickness of about 10 nm to 100 nm, for example.

The resistance increasing process may be performed on the anode of the capacitor element. As an alternative, the resistance increasing process may be performed on both the anode lead terminal and the anode of the capacitor element.

When the oxide coating is formed by the resistance increasing process on the anode of the capacitor element, the resistance increasing process of forming the oxide coating on the surface of the bonding portion of the anode is performed separately from the process of forming the dielectric layer 3 that is disposed on the anode to provide capacitance.

The cathode lead terminal 12 is fabricated by plating Au on the surface of the Cu base material 22a. More specifically, the cathode lead terminal 12 is fabricated through the steps of plating Ni on the Cu base material 22a to form a Ni plating layer that serves as an underlying layer, and plating Au on the Ni plating layer to form the Au plating layer 22b that serves as a surface layer (uppermost layer).

(3) Connection of Anode Lead Terminal and Cathode Lead Terminal (3-1) Connection of Anode Lead Terminal In this step, the anode 1 of the capacitor element 10 and the Cu region Y (i.e., the bonding portion 11b) of the anode lead terminal 11, which has been fabricated as described above, are bonded to each other by the resistance welding method for electrical connection between them.

The resistance welding is performed in this step under conditions of welding power of about 0.4 kW to 2.0 kW and power applying time of about 5 ms to 40 ms, for example.

In the solid electrolytic capacitor A according to this embodiment, as illustrated in FIG. 1, the two capacitor elements 10 are stacked one above the other to constitute the multilayer body 10A. The resistance welding is performed in a state where the respective anode lead-out portions 1b extending from the anodes 1 of the capacitor elements 10 are stacked one above the other and are placed on the Cu region Y (i.e., the bonding portion 11b) of the anode lead terminal 11. As a result, both the anode lead-out portions 1b are connected to the Cu region Y (i.e., the bonding portion 11b) of the anode lead terminal 11.

The step of connecting the anode lead terminal 11 to the anode 1 of the capacitor element 10 may be performed before or after a step, described below, of connecting the cathode lead terminal 12 to the cathode 2.

(3-2) Connection of Cathode Lead Terminal

Next, an end portion (opposite end portion) 12b of the cathode lead terminal 12 on the side opposite to the lead-out portion 12a is connected to the cathode 2 of the capacitor element 10 through a conductive adhesive 15, e.g., an Ag paste.

As seen from the above description, in the solid electrolytic capacitor A according to this embodiment, since the two capacitor elements 10 are stacked one above the other to constitute the multilayer body 10A as illustrated in FIG. 1, the cathode 2 of the lower capacitor element 10 is electrically connected to the cathode lead terminal 12 through the conductive adhesive 15, e.g., the Ag paste, and the cathode 2 of the upper capacitor element 10, which is stacked on the lower capacitor element 10, is electrically connected to the cathode 2 of the lower capacitor element 10 through the conductive adhesive 15.

It is to be noted that the number of the capacitor elements 10 is not limited to two as in the above-described embodiment, and that the solid electrolytic capacitor may be constituted by employing only one capacitor element. As an alternative, another multilayer body made up of two capacitor elements stacked one above the other may be disposed on the lower surface side of the cathode lead terminal 12 in FIG. 1 (namely, the solid electrolytic capacitor may include four capacitor elements).

The solid electrolytic capacitor may include an even larger number of capacitor elements.

(4) Formation of Outer Coating Resin

Next, the outer coating resin 20 is formed, as illustrated in FIG. 1, to cover the components of the solid electrolytic capacitor A (including the multilayer body 10A made up of the capacitor elements 10, the respective bonding portions 11b and 1b of the anode lead terminal 11 and the anode 1, and the bonded portion between the cathode lead terminal 12 and the cathode 2, etc.). Thus, those components are capsulated with the outer coating resin 20.

The outer coating resin 20 is molded by the transfer molding method, for example. At that time, the outer coating resin 20 is formed such that the Cu region Y (i.e., the bonding portion 11b) of the anode lead terminal 11, which region is bonded to the anode 1, is positioned within the outer coating resin 20 (namely, the Cu region Y (i.e., the bonding portion 11b) is buried inside the outer coating resin 20).

After forming the outer coating resin 20, extra parts of respective end portions (i.e., end portions on the side not bonded to the capacitor element) of the anode lead terminal 11 and the cathode lead terminal 12 are cut, and the remaining end portions are bent. As a result, the solid electrolytic capacitor A illustrated in FIG. 1 is obtained.

[Evaluation Test 1 for Confirming Advantageous Effect of Present Invention]

As a test sample for the anode lead terminal 11 (see FIG. 1) described above, the anode lead terminal 11 including the Au plating layer 21b formed on a region of the Cu base material 21a, the region becoming the lead-out portion 11a, (i.e., on a region of the Cu base material 21a except for the bonding portion 11b to the anode 1, including the opposite side surface thereof) was prepared in a similar manner to that in the above-described embodiment.

The Cu base material having a thickness of 0.10 mm was used as the anode lead terminal 11. An aluminum foil having a thickness of 0.11 mm and including a porous layer with a thickness of 0.04 mm formed on each of both principal surfaces of the aluminum foil was used as the anode (aluminum anode) 1 to which the anode lead terminal 11 is bonded.

Figure 3:
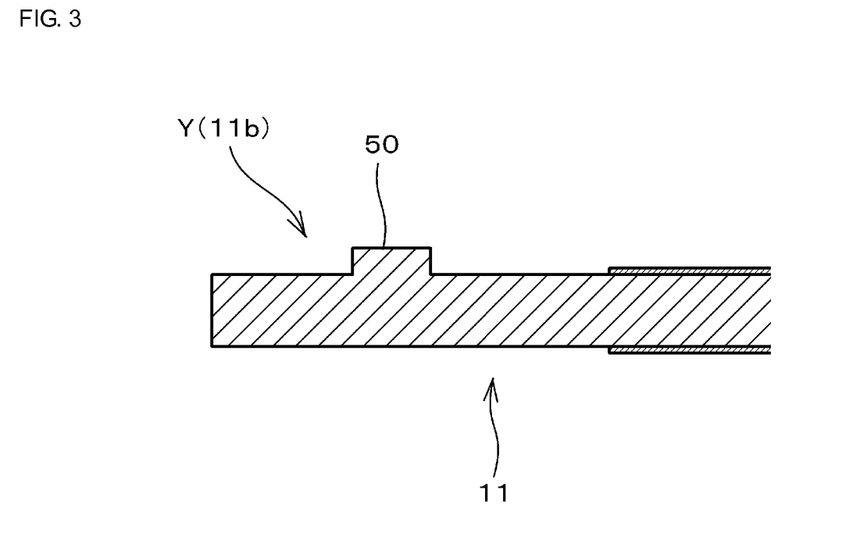
FIG. 3 schematically illustrates a state where a process of forming a protrusion on the bonding portion of the anode lead terminal with respect to the anode (i.e., the resistance increasing process) has been performed in Evaluation Test 1.

Then, as illustrated in FIG. 3, a protrusion (projection) 50 having a circular shape in a plan view with a diameter of 0.3 mm and a height of 0.05 mm was formed, by pressing, on the bonding portion (Cu-region Y) 11b of the anode lead terminal 11 with respect to the anode (specifically, to the anode lead-out portion).

Stated in another way, in this Evaluation Test 1, one protrusion (projection) 50 with a diameter of 0.3 mm and a height of 0.05 mm was formed on one bonding portion 11b of the anode lead terminal 11.

Then, the anode lead terminal was welded to the anode (specifically, the anode lead-out portion) by performing the resistance welding under conditions of the welding power set to values listed in Table 1 and the power applying time set to 14 ms.

Figure 4A:
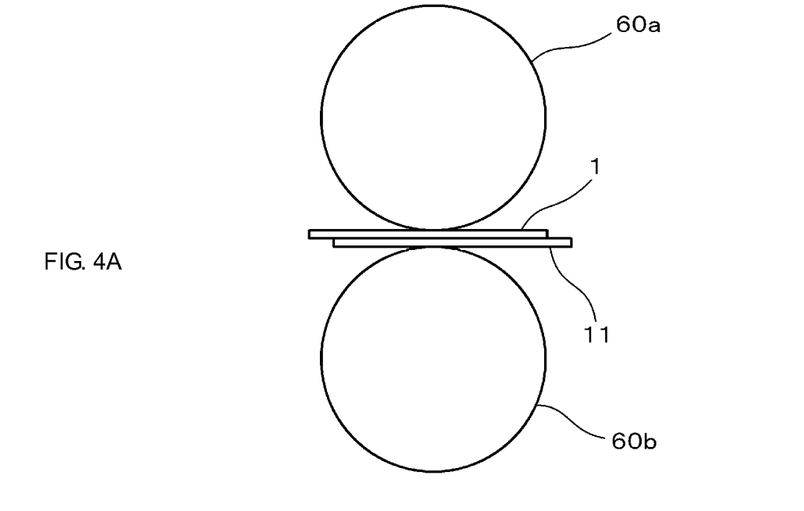
FIG. 4A schematically illustrates a method of performing resistance welding in a state where weld electrodes are arranged on the upper side and the lower side of weldments (i.e., the anode and the anode lead terminal)
Figure 4B:
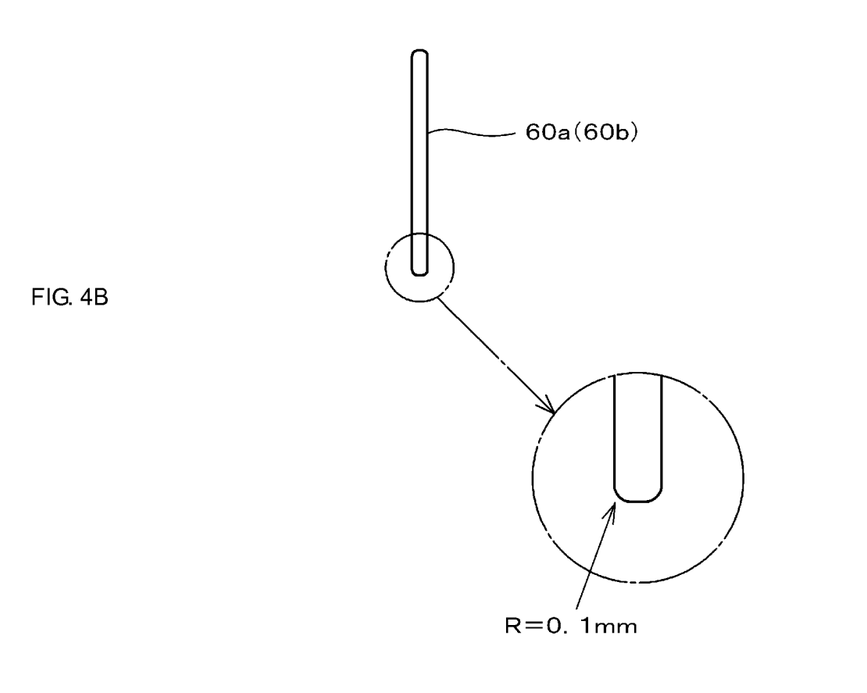
FIG. 4B illustrates a configuration of the weld electrode.

Regarding electrodes for the resistance welding, as illustrated in FIGS. 4A and 4B, weld electrodes each having a thickness of 1.0 mm and including an arc-shaped ridge portion, which was defined by a lateral surface and a circumferential surface of the weld electrode and which had roundness (radius of curvature) R of 0.1 mm, were used as a pair of weld electrodes 60a and 60b that were arranged respectively on the upper side and the lower side of the weldments (i.e., the anode 1 and the anode lead terminal 11).

For the purpose of comparison, an anode lead terminal not subjected to the resistance increasing process (i.e., the process of forming the above-mentioned protrusion) with pressing was prepared, and the prepared anode lead terminal was welded to the anode (specifically, the anode lead-out portion) under conditions of the welding power listed in Table 1.

A bonded state (i.e., an incidence of peeling) of the anode lead terminal with respect to the anode (specifically, the anode lead-out portion) was examined after performing the resistance welding in the above-described manner.

The examined results are also listed in Table 1.

TABLE 1

| Welding Power (kW) | Resistance Increasing Process (Without Formation of Protrusion) (number of samples causing peeling failure/total sample number) | Resistance Increasing Process (With Formation of Protrusion) (number of samples causing peeling failure/total sample number) |
|---|---|---|
| 1.20 | 0/50 | — |
| 1.00 | 3/90 | — |
| 0.80 | 9/88 | 0/32 |
| 0.60 | — | 0/96 |

As seen from Table 1, in the case of employing the anode lead terminal on which the protrusion (projection) was not formed, peeling (dropping) of the anode lead terminal occurred under conditions of the welding power of 0.80 kW and 1.0 kW, and highly reliable resistance welding free from peeling of the anode lead terminal could not be performed unless the welding power was increased to 1.2 kW.

In contrast, in the case of employing the anode lead terminal on which the protrusion (projection) was formed, it was confirmed that peeling of the anode lead terminal did not occur of course not only under condition of the welding power of 0.80 kW, but also under condition of 0.60 kW. Such a result is attributable to the fact that, when the anode lead terminal subjected to the resistance increasing process with the formation of the protrusion (projection) is used, the contact area of the anode lead terminal with the anode is reduced and electrical resistance during the resistance welding is increased, whereby the amount of heat generated in the portions to be welded is increased and highly reliable resistance welding is performed.

[Evaluation Test 2 for Confirming Advantageous Effect of Present Invention]

Figure 5:
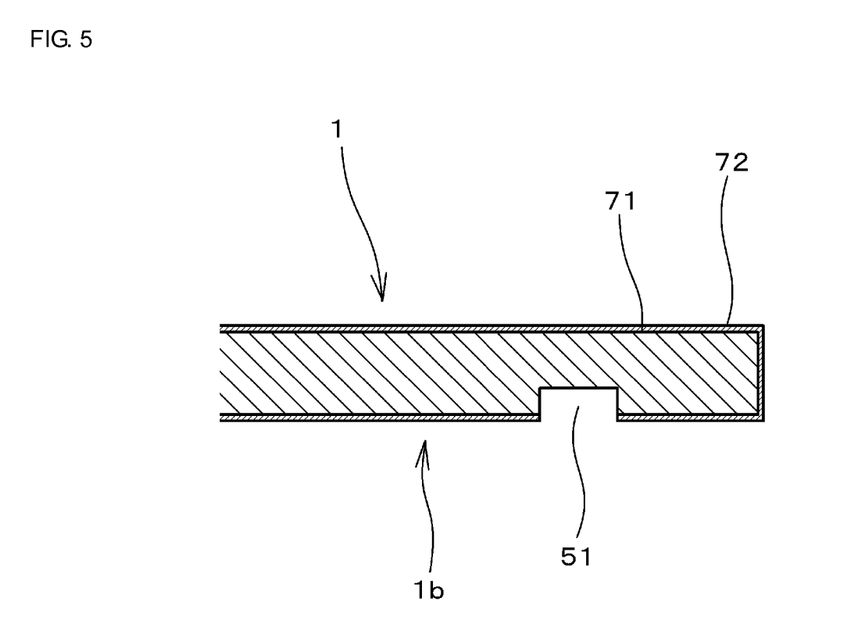
FIG. 5 schematically illustrates a state where a process of forming a recess in an anode lead-out portion (bonding portion) of the anode (i.e., the resistance increasing process) has been performed in Evaluation Test 2.

While, in the above-described Evaluation Test 1, the protrusion (projection) 50 was formed by the resistance increasing process in the bonding portion 11b of the anode lead terminal 11, the resistance increasing process was performed in Evaluation Test 2, as illustrated in FIG. 5, by forming a recess 51 in the anode lead-out portion (bonding portion) 1b of the anode 1, which was made of an aluminum foil 71 including a porous layer 72 formed thereon, with laser irradiation.

In Evaluation Test 2, particular processing (i.e., the resistance increasing process) was not performed on the anode lead terminal 11. The resistance increasing process was performed by forming, only in the anode lead-out portion 1b of the anode 1, two rectangular parallelepiped recesses 51 at spacing of 0.4 mm therebetween in the widthwise direction of the anode lead terminal 11 with laser irradiation, each recess 51 having a rectangular shape in a plan view with dimensions of 0.6 mm in the lengthwise direction (i.e., in the direction of length of the anode lead terminal) and of 0.4 mm in the widthwise direction (i.e., in the direction of width of the anode lead terminal), and having a depth of 10 μm.

Then, the anode lead terminal was welded to the anode (specifically, the anode lead-out portion) by performing the resistance welding under conditions of the welding power set to values listed in Table 2 and the power applying time set to 14 ms.

Other conditions were the same as those used in Evaluation Test 1 described above.

For the purpose of comparison, an anode not subjected to the resistance increasing process and an anode lead terminal also not subjected the resistance increasing process were bonded to each other by the resistance welding under conditions of the welding power set to values listed in Table 2.

Electrodes used in the resistance welding were prepared in the same conditions as those of the weld electrodes 60a and 60b, which were used in Evaluation Test 1 described above, except that the arc-shaped ridge portion defined by the lateral surface and the circumferential surface of the electrode had roundness (radius of curvature) R of 0.2 mm (see FIG. 4).

A bonded state (i.e., an incidence of peeling) of the anode lead terminal with respect to the anode (specifically, the anode lead-out portion) was examined after performing the resistance welding in the above-described manner.

The examined results are also listed in Table 2.

TABLE 2

| Welding Power (kW) | Resistance Increasing Process (Without Formation of Recess) (number of samples causing peeling failure/total sample number) | Resistance Increasing Process (With Formation of Recess) (number of samples causing peeling failure/total sample number) |
|---|---|---|
| 0.80 | 0/160 | 0/32 |
| 0.60 | 5/64 | 0/31 |
| 0.50 | — | 0/32 |

As seen from Table 2, in Comparative Example in which the resistance increasing process (i.e., the process of forming the recess with the laser irradiation) was not performed on each of the anode and the anode lead terminal, peeling (dropping) of the anode lead terminal occurred under condition of the welding power of 0.60 kW, and highly reliable resistance welding free from peeling of the anode lead terminal could not be performed unless the welding power was increased to 0.80 kW.

The reason why, in the samples of Comparative Example not subjected to the resistance increasing process, the welding power at which the resistance welding can be performed free from peeling of the anode lead terminal shifts to a level lower than that in Evaluation Test 1 resides in that Evaluation Test 2 employs the weld electrodes in each of which an arc-shaped ridge portion defined by a lateral surface and a circumferential surface of the weld electrode had roundness (radius of curvature) R of 0.2 mm larger than that (R=0.1 mm) of the ridge portion of the weld electrode used in Evaluation Test 1.

It is to be noted that, as the roundness R of the above-mentioned ridge portion of the weld electrode has a larger value, an effective area of the weld electrode is reduced and energy is concentrated in a narrower range, whereby welding can be performed with lower welding power.

In contrast, in the case of forming the recesses 51 in the anode 1 with the laser irradiation, it was confirmed that peeling of the anode lead terminal did not occur even when the welding power was reduced to 0.50 kW. Such a result is attributable to the fact that, since the process of forming the recess with the laser irradiation is performed as the resistance increasing process on the anode, the contact area of the anode with the anode lead terminal during the resistance welding is reduced and electrical resistance during the resistance welding is increased, whereby the amount of heat generated in the portions to be welded is increased and highly reliable resistance welding is performed.

While the Evaluation Tests have been described above in connection with the case where the resistance increasing process is performed on one of the anode and the anode lead terminal, the resistance increasing process may be performed on both the anode and the anode lead terminal. In such a case, it is also possible to increase the amount of heat generated in the portions to be welded, and to perform highly reliable resistance welding.

While, in the Evaluation Tests described above, the process of forming the projection or the recesses in one of the anode and the anode lead terminal is performed as the resistance increasing process, a process of forming one or more penetration holes in at least one of the anode and the anode lead terminal to reduce the contact area between them may be performed as the resistance increasing process. Moreover, a process of forming an oxide coating on the surface of at least one of the anode and the anode lead terminal to increase the resistance may be performed as the resistance increasing process.

Even when the resistance increasing process is performed in any of the above-mentioned modified manners, similar advantageous effects to those in Evaluation Tests 1 and 2 can be obtained.

According to the embodiments of the present invention, since the contact resistance between the anode lead terminal and the anode can be reliably increased, the present invention is applicable, depending on conditions, to even the case where a noble metal film, e.g., an Au plating film, is formed on the surface of the anode lead terminal or the anode.

Regarding other points than described above, the present invention is also not limited to the matters mentioned in the foregoing embodiments and the Evaluation Tests. In other words, the present invention can be variously modified within the scope of the invention in relation to the number of the capacitor elements constituting the solid electrolytic capacitor, the specific configuration of the capacitor element, the specific shapes and structures of the bonding portions of the anode and the anode lead terminal, etc.

What is claimed is:

1. A solid electrolytic capacitor comprising:
   a capacitor element that includes an anode having a first bonding portion, a dielectric layer on at least a portion of the anode, and a cathode on the dielectric layer; and
   an anode lead terminal having a second bonding portion resistance welded to the first bonding portion of the anode, wherein
   at least one of the first bonding portion of the anode lead terminal and the second bonding portion of the anode has an oxide coating, and the oxide coating has a thickness of 10 nm to 100 nm.

2. The solid electrolytic capacitor according to claim 1, wherein the first bonding portion of the anode lead terminal has the oxide coating.

3. The solid electrolytic capacitor according to claim 1, wherein the second bonding portion of the anode has the oxide coating.

* * * * *